(12) United States Patent
Belkin et al.

(10) Patent No.: US 7,398,088 B2
(45) Date of Patent: Jul. 8, 2008

(54) HANDOVER METHOD AND APPARATUS

(75) Inventors: Anatoly S. Belkin, Glenview, IL (US); Alex P. Hirsbrunner, Bloomingdale, IL (US); Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 558 days.

(21) Appl. No.: 10/674,254

(22) Filed: Sep. 29, 2003

(65) Prior Publication Data
US 2005/0070288 A1 Mar. 31, 2005

(51) Int. Cl.
*H04Q 7/20* (2006.01)
(52) U.S. Cl. ............... 455/439; 455/436; 455/442; 455/443; 455/444; 370/331; 370/329; 370/328
(58) Field of Classification Search ........... 455/439, 455/444, 436, 445, 552.1, 442, 443, 422.1
See application file for complete search history.

(56) References Cited

U.S. PATENT DOCUMENTS

| | | | | | |
|---|---|---|---|---|---|
| 5,664,007 | A * | 9/1997 | Samadi et al. | ............... | 455/442 |
| 5,793,762 | A * | 8/1998 | Penners et al. | ............... | 370/389 |
| 6,327,470 | B1 * | 12/2001 | Ostling | ............... | 455/437 |
| 6,424,638 | B1 * | 7/2002 | Ray et al. | ............... | 370/331 |
| 6,553,232 | B1 * | 4/2003 | Shaffer et al. | ............... | 455/440 |
| 6,747,961 | B1 * | 6/2004 | Ahmed et al. | ............... | 370/328 |
| 6,766,168 | B1 * | 7/2004 | Lim | ............... | 455/435.1 |
| 6,771,776 | B1 * | 8/2004 | Rose | ............... | 380/272 |
| 2002/0051432 | A1 * | 5/2002 | Shin | ............... | 370/331 |
| 2002/0126701 | A1 * | 9/2002 | Requena | ............... | 370/469 |
| 2003/0134638 | A1 * | 7/2003 | Sunder et al. | ............... | 455/435 |
| 2003/0227883 | A1 * | 12/2003 | Rimoni et al. | ............... | 370/331 |
| 2004/0122976 | A1 * | 6/2004 | Dutta et al. | ............... | 709/245 |
| 2004/0246990 | A1 * | 12/2004 | Krishnamurthi et al. | ............... | 370/466 |
| 2005/0037758 | A1 * | 2/2005 | Rimoni | ............... | 455/436 |

* cited by examiner

Primary Examiner—Vincent P. Harper
Assistant Examiner—Khai M Nguyen (57) ABSTRACT

A method (FIG. 11) and corresponding wireless communication unit (102, FIG. 5) and mobility manager (116, FIG. 6) for facilitating a handover from one communication network (106) to another communication network (108) of an ongoing communication (120, 122) between a wireless communication unit (102) and a peer communication unit (114, 714). The method including obtaining call information (1103) corresponding to the ongoing communication where the ongoing communication uses the first communication network; and ascertaining a handover number (1105) for use by the wireless communication unit to originate a handover call (1107) via the second network (108), the handover number terminating within the first communication network for use in facilitating the handover of the ongoing communication to the second communication network.

25 Claims, 7 Drawing Sheets

HANDOVER METHOD AND APPARATUS

FIELD OF THE INVENTION

The present invention relates in general to wireless communication units and wireless networks, and more specifically to a handover method and apparatus for communication with such wireless communication units operating within such wireless networks.

BACKGROUND OF THE INVENTION

Wireless Local Area Networks (WLANs) are being contemplated or are known. Such WLANs are typically supported by WLAN servers, which may alternatively be referred to as private branch exchanges (PBXs) or enterprise servers. The PBX normally provides a control and switching function for the WLAN and communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs) such as conventional cellular telephone systems are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN. In situations, sometimes referred to as loosely coupled systems, where the WAN is essentially not aware of the WLAN or communication unit operating thereon this can present problems, particularly for ongoing communication and handoffs or handovers thereof.

Therefore, a need exists for methods and apparatus to support handovers or handoffs between a first and a second communication network

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

In overview, the present disclosure concerns wireless communication devices or units, often referred to as communication units, such as cellular phone or two-way radios and the like and communication networks or systems that provide services such as voice and data communication services to or for such communication units. More particularly various inventive concepts and principles are embodied in systems or constituent elements, communication units, and methods therein for providing handover or seamless handover of an ongoing communication between the communication unit and another communication unit from a first communication network to a second communication network. Note that communication unit may be used interchangeably herein with wireless subscriber device or unit and each of these terms denotes a device ordinarily associated with a user and typically a wireless communication unit that may be used with a public network in accordance with a service agreement or within a private network. Examples of such units include personal digital assistants, personal computers equipped for wireless operation, a cellular handset or device, or equivalents thereof provided such units are arranged and constructed for operation in different networks.

The communication systems and communication units that are of particular interest are those that may provide or facilitate voice communication services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, integrated digital enhanced networks and variants or evolutions thereof. Furthermore the wireless communication units or devices of interest have short range wireless communication capability normally referred to as WLAN capabilities, such as IEEE 802.11, Bluetooth, or Hiper-Lan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate a handover of an ongoing communication or communication link from a first wireless communication network (first network) to a second wireless communication network (second network). This is facilitated by providing a handover number that may be called from or by a moving communication unit using the second network where the handover number terminates on a network element or mobility manager in the first network. In this manner, advantageously a handover may be accomplished without dropping the ongoing communication and without the second network being aware of the first network.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
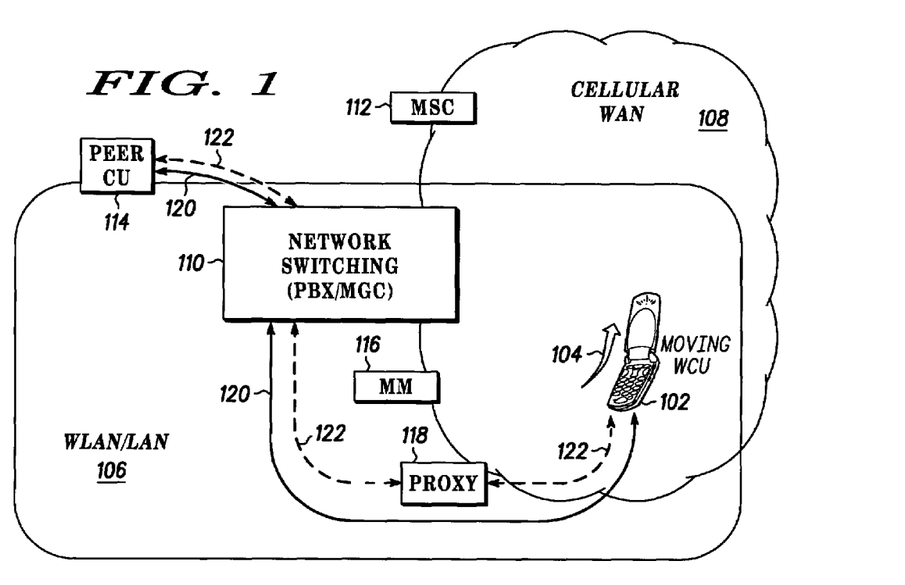
FIG. 1 depicts, in a simplified and representative form, an exemplary system diagram where a handover method and apparatus for handover of an ongoing communication between two wireless communication networks can be implemented.

Referring to FIG. 1, a simplified and representative environment or system diagram where a handover method and apparatus can be implemented will be discussed and described. The handover method and apparatus is for handing over, e.g. handover, of an ongoing communication from a first to a second wireless communication network. The diagram generally shows a communication unit 102 that is portable or mobile and that can move (depicted generally by arrow 104) throughout a service area of a first wireless communication network (first network) 106 and a service area for a second wireless communication network (second network) 108. In this exemplary embodiment, the first network 106 is or includes a wireless local area network (WLAN) and the second network 108 is, in one embodiment, a cellular packet data network or other cellular or cellular like network otherwise referred to as a cellular wide area network (cellular WAN) or simply WAN. The first network 106 includes a network switching function 110 that may alternatively be referred to as Private Branch Exchange (PBX), enterprise server, media gateway controller (MGC) and so on. The second network or WAN 108 includes a network switching function 112, alternatively referred to as a mobile switching center or MSC. The coverage area of the second network is typically much larger than that of the first network and overlaps in total or in part the coverage area of the first network as depicted. Note that first and second networks will be used in the description but these terms may be interchanged, e.g. the first network could be a WAN and the second network a WLAN, or both could be WLANs for example.

Also it will be appreciated that a large number of entities or functions that are part of typical networks are not specifically shown but understood to be present and operational. For example in the first network 106 or WLAN a large number of Access Points that support a radio or wireless link with a wireless communication unit and thereby couple the unit to the balance of the network are not shown as well as typical network routing equipment such as servers, concentrators, routers, etc. The second network or wireless WAN (hereafter WAN) similarly typically includes a plurality of base transmitters and antenna towers as well as base site controllers that all serve to provide a radio access network for communication units as well as various registrars, billing servers and so forth. Note that while the first and second networks 106, 108 are referred to as wireless networks, much of these networks or the respective elements thereof are intercoupled using terrestrial based wires. For example, the switching functions 110, 112 are normally coupled to the balance of their respective networks using ordinary cables or wires. Furthermore the WLAN 106 can include and support voice services for stationary or static communications units that are coupled to the network using conventional cabling or wires. Thus the discussions below will refer alternatively to the first communications network 106 as a WLAN or LAN.

Both networks 106, 108 via the switching functions 110, 112 will likely be intercoupled to a public switched telephone and data network and thus coupled to each other. Furthermore the networks in a preferred embodiment are packet data networks using packet switched methodologies. Furthermore the communication networks utilize some form of protocol for setting up sessions or connections with other units. Various known protocols can be used, such as H.323 defined and promulgated by the International Multimedia Telecommunication Consortium (IMTC) (see http://www.imtc.org/h323.htm and associated websites for descriptive documents) or Session Initiation Protocol (SIP) as defined by IETF in RFC3261 document. Much of the discussion below, where relevant will assume that SIP and SIP constructs and entities are being utilized in the WLAN and that legacy cellular or dispatch protocols are being utilized in the WAN, where it is understood that similar functions and methods are available using other protocols if desired.

The network switching function 110 may serve a single enterprise location, such as an office building or may serve multiple enterprise sites, possibly located in different cities. The network switching function 110 or enterprise server may serve a WLAN hotspot, or multiple WLAN hotspots. It may also serve one or more WLAN coverage areas in private homes that may be connected to the network switching function 110 by such means as IP broadband connections. Generally the network switching function operates to establish a connection between wireless communication units within the WLAN, such as unit 102 and peer communication units, such as peer communication unit 114. Note that the connection from the wireless communication unit is a packet data connection and the connection from the peer communication unit will depend on the particulars for the peer unit. For example if the peer communication unit is another static or wireless communication unit within the WLAN or LAN the connection will also be a packet data based connection, while if the peer unit is an ordinary phone outside the LAN or WLAN 106 the connection is likely a circuit switched connection.

Other network entities, specifically depicted are a mobility manager 116 and proxy server 118. The mobility manager 116 operates to facilitate handover activities from one to the other network when required and as discussed further below. The proxy server 118 may or may not be present but if present generally provides a central point or network address that all communication units can contact when they intend to set up a call or connection with another unit. The proxy server will have the most up to date location information for or address, e.g. know where to find, another communication unit or the network switching function 110 in accordance with known techniques. Note that the mobility manager 116 can be a stand-alone entity or the functionality of the mobility manager can be combined with the proxy server 118 or with the network switching function 110. For reasons that will be become clearer below it may be advantageous to combine the mobility manager and proxy server if one is available. In that instance the mobility manager can become incremental software programs operating or executing on the same network based computing platform as the proxy server.

Further shown is an ongoing communication between the wireless communication unit 102 and the peer communication unit 1114. The signaling or control portion of this ongoing communication is depicted by the dotted lines 122 with the signaling path shown as from the wireless communication unit 102 to the proxy server 118 to the network switching function 110 and then the peer communication unit 114. The bearer portion of the ongoing communication is shown by the solid lines 120 with the path including the leg between the wireless communication unit 102 and the network switching function 110 and then the leg to the peer unit 114. Note that if the peer communication unit 114 is within the LAN or WLAN the bearer and possibly the signaling path would not need to go through the network switching function once the communication is set up. The bearer in fact could go directly from the wireless communication unit to the peer communication unit. In one embodiment the signaling portion of communication (setup, control, and teardown) is done using SIP messaging. The bearer portion or actual voice and data is carried using VoIP (voice over IP) techniques and real time protocol (RTP) and User Datagram Protocol (UDP).

In FIG. 1 as is known the communication units are mobile and can move around within the WLAN or the WAN and routinely move out of range of the WLAN, e.g. into the WAN and vice versa. When this happens with a call or communication in progress a handover or handover of the ongoing communication from one system or network to the other is required. This handover, sometimes referred to as handout when the handover is from the WLAN to the WAN, should be seamless or barely noticeable in order to avoid hampering, interrupting, or dropping ongoing communication and in general keep users satisfied. Various inventive techniques and apparatus that advantageously address this issue will be the dominant focus of the balance of the present disclosure.

Figure 2:
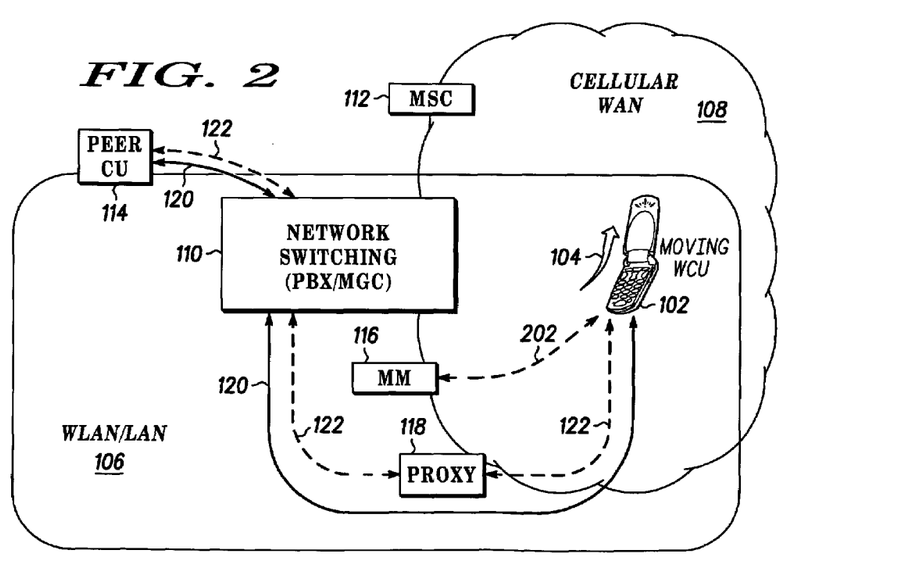
FIG. 2 and FIG. 3 depict various exemplary states in the handover of the ongoing communication for the FIG. 1 system.
Figure 3:
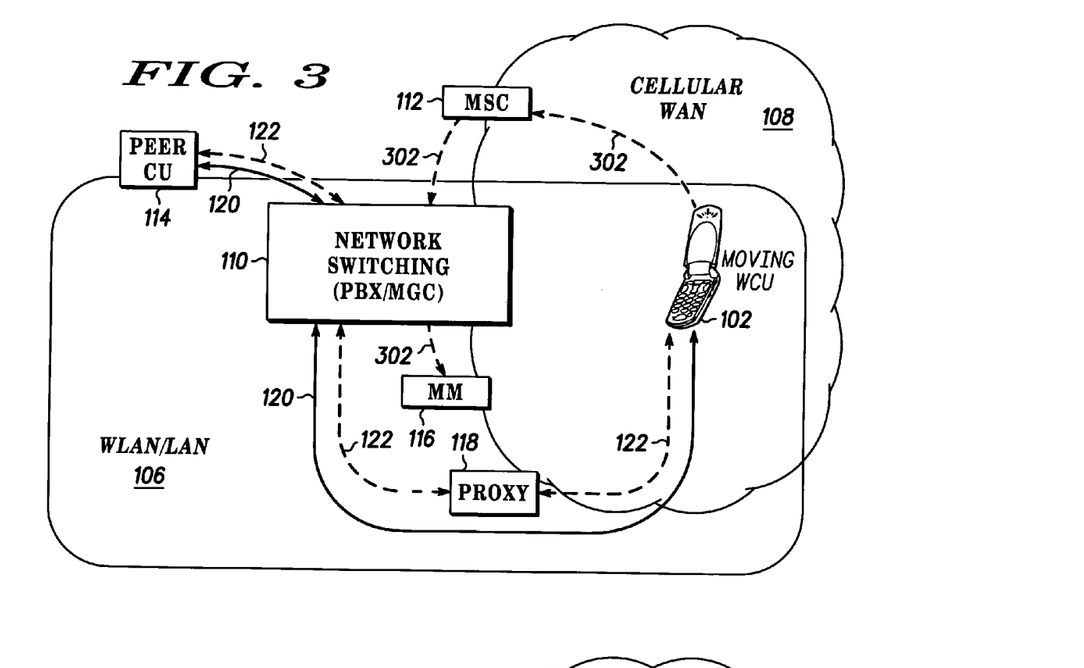

Referring to FIG. 2 and FIG. 3, where like reference numerals refer to like entities, various exemplary states in the handover of the ongoing communication within the FIG. 1 system or diagram will be discussed and reviewed. Initially with reference to FIG. 2 it is noted that the wireless communication unit 102 has moved closer to the edge of the WLAN or LAN 106. Note also that the ongoing communication is still underway via the WLAN as represented by the solid lines 120 and the dotted lines 122. As the wireless communication unit 102 moves closer to the boundary of the WLAN 106 it will be determined that a handover of the ongoing communication may be imminent and thus preparation for a handout must be undertaken. This determination can be done by the wireless communication unit or another entity within the LAN, such as the proxy server or network switching function or one of the other network entities that are understood to be present assessing signal quality for the signaling or bearer portion of the ongoing communication. Generally if the signal quality level, e.g. signal to noise, or frame error rate or like assessment crosses some threshold it is determined that a handover is likely.

At least by that point the wireless communication unit 102 and another network entity, such as the mobility manager 116 need to ascertain a handover number, represented by dashed line 202, that will be used by the wireless communication unit in facilitating the handover of the ongoing communication to the second communication network or WAN 108. The handover number is chosen or provided or selected such that a call placed by the wireless communication unit after appropriate registration, etc. to the handover number via the second communication network will be routed through the network switching function 112 or MSC to the network switching function 110, and terminate within the first communication network at the other network entity, such as the mobility manager 116.

Note that various embodiments are contemplated for providing the handover number. For example, this may be a predetermined number that is programmed into one of or both of the wireless communication unit and the other network entity, e.g. mobility manager 116, for use in facilitating handover calls. If the number is programmed into only one of the other network entity and wireless communication unit, the one with the number can provide the number to the other 202. The handover number may be selected by for example, the other network entity or mobility manager 116 from a pool of such numbers where the size of the pool can be from 1 to several possible handover numbers and then provided to the wireless communication unit 102. Note that the handover number, if not preprogrammed, can be provided as required at any time during or after the ongoing communication is setup and in one embodiment is provided during the setup processes and included within one of a Session Initiation Protocol (SIP) INVITE message or a SIP message, such as SIP OK message, that is responsive to a SIP INVITE message, depending on which unit initiates the setup call and which entity needs to be notified of the handover number.

In addition to the handover number being known to both the wireless communication unit 102 and other network entity, e.g. mobility manager 116, appropriate call information corresponding to the ongoing communication between the wireless communication unit and the peer communication unit, needs to be obtained by the mobility manager 116 or relevant other network entity. This call information can take many forms but must be sufficient to identify the relevant communication and portions thereof. For example, in a SIP controlled IP call, the call information that is available and is sufficient to accomplish the end objectives will include a Call-ID, From and To headers and corresponding tags, Cseq sequence numbers, relevant Session Description Protocol (SDP) information on the bearer, contact addresses where SIP messages are sent, and routes or routing, etc.

The call information needs to be obtained by the mobility manager or other network entity that is providing the appropriate functionality. This information can be obtained from, for example the wireless communication unit as depicted via the dashed line 202 or anther network entity, such as a network server, for example the proxy server 118 or network switching function 110, if properly configured, that is monitoring or participating in the communication or communication setup. This is one reason that it can be especially advantageous if the mobility manager is co-located with this network server, such as the proxy server when one is utilized or some other network entity that is always aware of call setup activities. In this instance the relevant call information can be obtained during call setup for the communication by simply providing the details from the proxy or other server to the mobility manager function within the same network platform, via a software interface, for example. Furthermore in some embodiments it will be useful if the mobility manager 116 or analogous functionality obtains sufficient information from or about the wireless communication unit, such that the mobility manager can send or respond to SIP messages as though it was or on behalf of the wireless communication unit or in some instances the peer communication unit 114. This can prove useful in the event that the ongoing communication with the wireless communication unit fails before the handover is fully realized.

Referring to FIG. 3 where like reference numerals refer to similar entities as above discussed and after preparing for the handover as discussed above with reference to FIG. 2, the process for starting the handover of the ongoing communication will be discussed and described. The ongoing communication continues as indicated by lines 120, 122, provided that the WLAN coverage is still available. The wireless communication unit 102 after a successful registration with the second wireless communication network 108, initiates a handover call using the second network, such as a wireless wide area network, e.g. cellular network, where the handover call is addressed to the handover number that was ascertained and discussed above. The handover call is routed through the network switching function 112 or MSC and coupled to the network switching function 110 where it is routed to and terminated by the mobility manager 116 as indicated by dashed lines 302. The mobility manager acknowledges reception of the handover call, typically embodied as a SIP INVITE message or message with similar functionality if an alternative protocol is used. The acknowledgment can be in the form of a SIP ringing indication although it is preferable that the mobility manager does not allow the call to connect, e.g. no SIP OK message for the moment.

Figure 4:
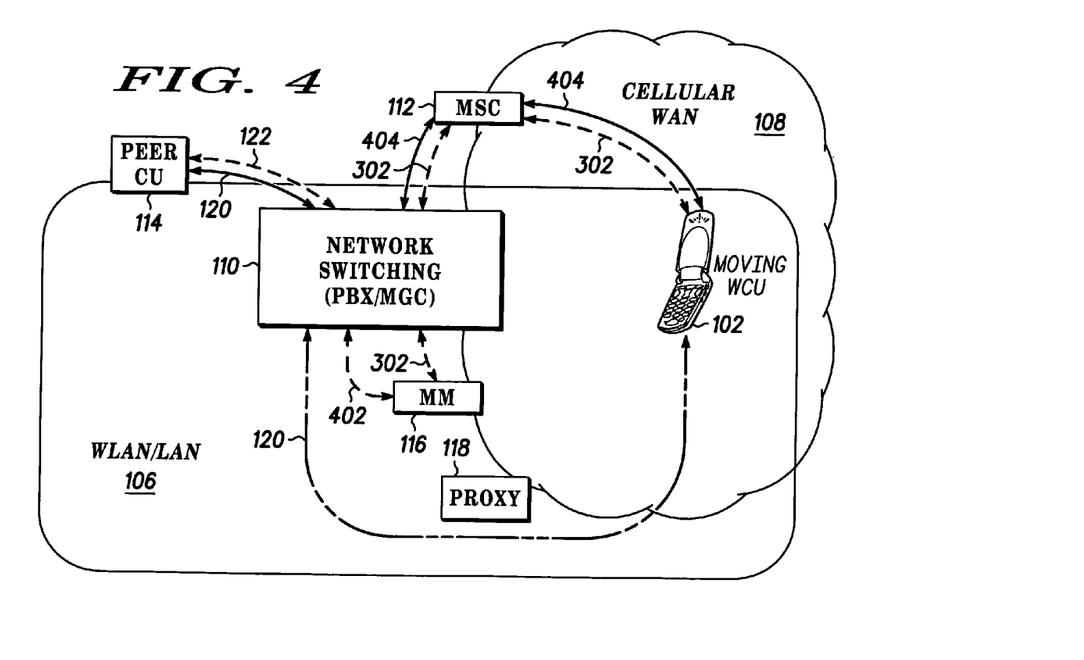
FIG. 4 shows the system diagram of FIG. 1 after the handover of the ongoing communication has been accomplished.

Referring to FIG. 4, the diagram of the FIG. 1 system after the handover has been accomplished or nearly accomplished will be discussed and described. The mobility manager operates to facilitate connecting the peer communication unit to the handover call and sending a connect indication, such as SIP OK message, for the handover call to the wireless communication unit. Connecting the peer communication unit to the handover call can be accomplished by a) transferring the ongoing communication of the peer communication unit to the handover call, b) conferencing the ongoing communication of the peer communication unit, the ongoing communication via the WLAN of the wireless communication unit, and the handover call together, or c) rerouting the ongoing communication with the peer communication unit to coincide with the routing of the handover call at the network switching function.

Unique messages can be developed to perform the interface, depicted as dashed line 402, from the mobility manager to the network switching function 110 so as to accomplish the connecting objective, where the mobility manager would use the call information obtained as discussed above with reference to FIG. 2 or the call information corresponding to the handover call. Alternatively the mobility manager can formulate and send messages, such as SIP messages, on behalf of or as though it were the wireless communication unit 102. When the mobility manager 116 gets the handover call, it can construct a SIP message that it directs to the contact address specified for the ongoing call, e.g. the network switching function 110 as depicted, such that the message looks to the network switching function 110 as if it came from the wireless communication unit 102. The mobility manager can also pretend that the handover call from the network switching function to the mobility manager 116 went to the wireless communication unit, rather than the mobility manager. The message directs or requests the network switching function 110 to either transfer the ongoing communication 120, 122 from the peer communication unit to the handover call 404 from the wireless communication unit 102 or to put the ongoing communication from the peer communication unit 114, the ongoing communication 120 from the wireless communication unit, and the handover call 404 into a conference arrangement, using for example a SIP REFER message. The details of other re-routing techniques will be discussed below with reference to FIG. 7-FIG. 10. After the handover has been accomplished, the mobility manager can terminate the ongoing communication 120 from the wireless communication unit 102 by again sending a SIP message on behalf of the unit. With this overview a more detailed discussion of exemplary embodiments of the wireless communication unit 102 and mobility manager 116 will be undertaken.

Figure 5:
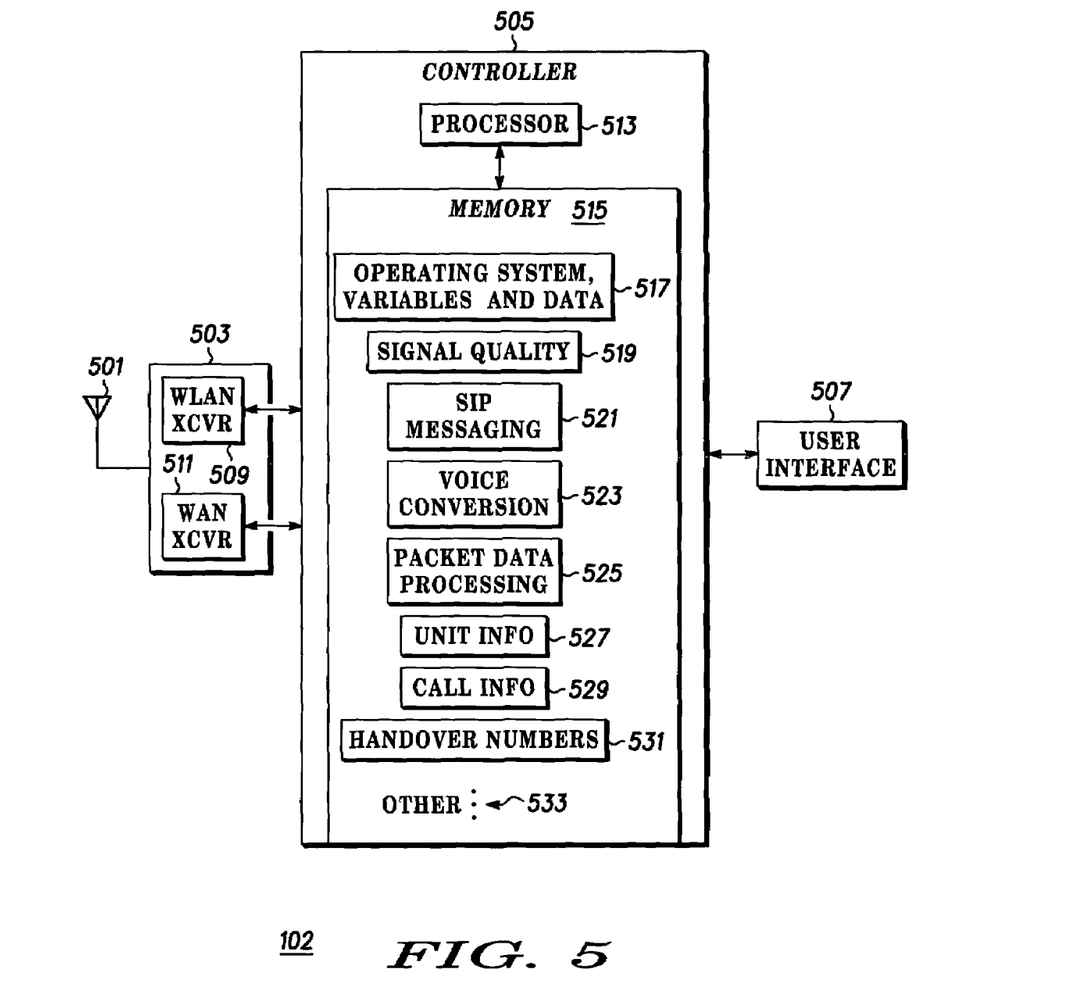
FIG. 5 depicts a simplified block diagram of a wireless communication unit arranged for facilitating a handover of an ongoing communication with the wireless communication unit from one to another wireless communication networks.

Referring to FIG. 5, a simplified block diagram of a wireless communication unit 102 that is arranged for facilitating a handover of an ongoing communication with the wireless communication unit from a first to a second wireless communication network will be discussed and described. The communication unit 102 is generally known other than the modifications and improvements disclosed herein. Thus the known functions and structure of such devices will not be described in detail other than as related to the inventive principles and concepts disclosed and discussed below. The communication unit 102 includes an antenna 501 or antenna structure that operates to couple radio frequency signals between a transceiver 503 and the first or second network 106, 108 as is known. For example, radio signals that are transmitted from the WLAN 106 or WAN 108, such as respectively, by an access point (WLAN transceiver) or base transmitter site (WAN transceiver) are absorbed by the antenna 501 and coupled to a receiver, that is part of the transceiver 503.

Respectively, signals that are amplified by and coupled from the transceiver 503, specifically a transmitter (WLAN transmitter or WAN transmitter), to the antenna 501 are radiated or transmitted or sent to the access point or base transmitter site according to known WLAN technologies, such as 802.11 and others earlier mentioned or WAN technologies, such as known cellular networks. The transceiver 503 will be configurable to support simultaneous air interfaces with multiple communication networks according to the conventions and protocols of each or may alternatively further include one or more of a WLAN transceiver 509 and WAN transceiver 511 for such purposes as will be appreciated by those of ordinary skill. The transceiver 503 or respective receivers and transmitters are inter coupled as depicted and interactively operate with and are controlled by a controller 505 to provide to, or accept or receive from the controller 505, voice traffic or data messages or signals corresponding thereto in packet data form.

Accordingly, the transceiver 503 as controlled by and in cooperation with the controller 505 and functions thereof provide the communication unit 102 with multi or dual operating mode capability. More particularly, the communication unit 102 is capable of registering with and obtaining service from a first and a second communication network, such as a WLAN as well as a cellular network or WAN. For purposes of simplifying this disclosure, the balance of the discussion will refer to only the transceiver 503 and it is understood the transceiver with the controller 505 has the capability to establish and maintain a connection via either of or both the first and the second networks 106, 108.

The controller 505 is coupled to and generally operates in a known manner with a user interface 507, except for the modifications required according to the principles and concepts discussed here. The user interface 507 is known and typically includes, for example, audio transducers, such as an earphone or speaker and microphone, a display and a keypad. The transceiver and user interface are each inter coupled, as depicted to the controller 505 and the controller provides overall operational command and control for the communication unit 102.

The controller 505 is essentially a general-purpose processor and, preferably, includes a processor 513 and an associated memory 515. The processor 513 is, preferably, a known processor based element with functionality that will depend on the specifics of the air interfaces with the first and the second network as well as various network protocols for voice and data traffic. The processor 513 will operate to encode and decode voice and data messages to provide signals suitable for the transceiver, a transducer, or further processing by the controller 505. The processor 513 may include one or more generally available microprocessors, digital signal processors, and other integrated circuits depending on the responsibilities of the controller 505 with respect to signal processing duties or other unit features that are not here relevant.

In any event the controller 505 also includes the memory 515 that may be, for example, a combination of known RAM (Random Access Memory), ROM (Read-Only Memory), EEPROM (Electrically Erasable Programmable ROM) or magnetic memory. The memory 515 is used to store among various other items or programs etc., an operating system or software, data, and variables 517 for execution or use by the processor 513. This operating software 517 when executed by the processor 513 will result in the processor performing the requisite functions of the communication unit 102 such as interfacing with the user interface 507 and transceiver 503 or transmitting and receiving devices. The memory 515 further includes call processing routines not specifically shown for supporting voice and data calls that will be appreciated by one of ordinary skill and that will vary depending on air interface, call processing, and service provider or network specifics.

As depicted, the memory 515 further includes in some embodiments a signal quality assessment routine 519 for use in determining whether a handover may be required if the wireless communication unit 102 is responsible for that determination as above discussed. This routine is used to assess signal quality and compare that to a threshold value and depending on the result determine whether a handover situation is imminent. The specifics may be communication unit specific and in any event can be experimentally determined and modified as experience dictates. In one embodiment SIP messaging routines 521 are provided for generating and responding to SIP messages according to known techniques. In one embodiment these routines are used to support the air interface with the first and second communication network, initiate handover calls and the like. Also depicted is a voice conversion or vocoder routine. This routine may be used in conjunction with other specialized portions of the processor to convert voice to digital form and digital voice to a form that can be reproduced in an audio format for use in driving a speaker or earpiece. Additionally, packet data processes 525 are provided for formulating appropriate packets for transport according to the specifics of the communication networks. Furthermore various data is provided in the memory, specifically unit information 527 including identification information to identify the communication unit and call information 529, such as noted above. Collectively this information can be used to identify a particular unit and a particular call, should a handover be required. At 531 a handover number is located. This handover number can be obtained at initial configuration or provisioning or assigned by a network entity, such as the mobility manager on a call by call basis. Various other routines 533 that are not especially relevant to the disclosure and that will be obvious to one of ordinary skill given a specific communication unit will not be discussed.

In operation the wireless communication unit 102 comprises the transceiver 503 that is suitable to support an air interface with a first wireless communication network, such as network 106, and with a second wireless communication network, such as network 108; and the controller 505 that is coupled to and controlling the transceiver and operable for obtaining a handover number that terminates on, for example, the mobility manager 116. The mobility manager is associated with the first communication network and the handover number is useable to facilitate a handover of an ongoing communication between the wireless communication unit 102 and a peer communication unit 114, where the handover is from the first wireless communication network to the second wireless communication network.

In some embodiments, the first wireless communication network is a wireless local area network and the second wireless communication network is a wireless wide area network. The wireless communication unit, specifically the controller operating with the transceiver can obtain the handover number during the setup of the ongoing communication. If the WLAN uses SIP messaging or call setup processes, the handover number can be obtained by including it in one of a Session Initiation Protocol (SIP) INVITE message and a response message to the SIP INVITE message, depending on which party initiates setting up the ongoing communication as well as which of the participants in the ongoing communication needs to obtain the handover number.

In some embodiments the controller 505 controls the transceiver 503 to obtain the handover number from a network entity, such as the mobility manager 116, within the first communication network. Furthermore, the controller can control and cooperate with the transceiver 503 to forward information regarding the ongoing communication to the network entity or the mobility manager to facilitate the handover. When a pending handover is indicated as determined by the communication unit, using the signal quality routines 519 or other network entity, the controller 505 controls the transceiver to initiate a handover call, using the SIP messaging routines 521 and packet data processes 525 using the second wireless communication network, the handover call addressed to the handover number 531. Once the handover call has been connected, the controller controls and cooperates with the transceiver to switch the ongoing communication to the second wireless network and to discontinue the ongoing communication with the first communication.

Figure 6:
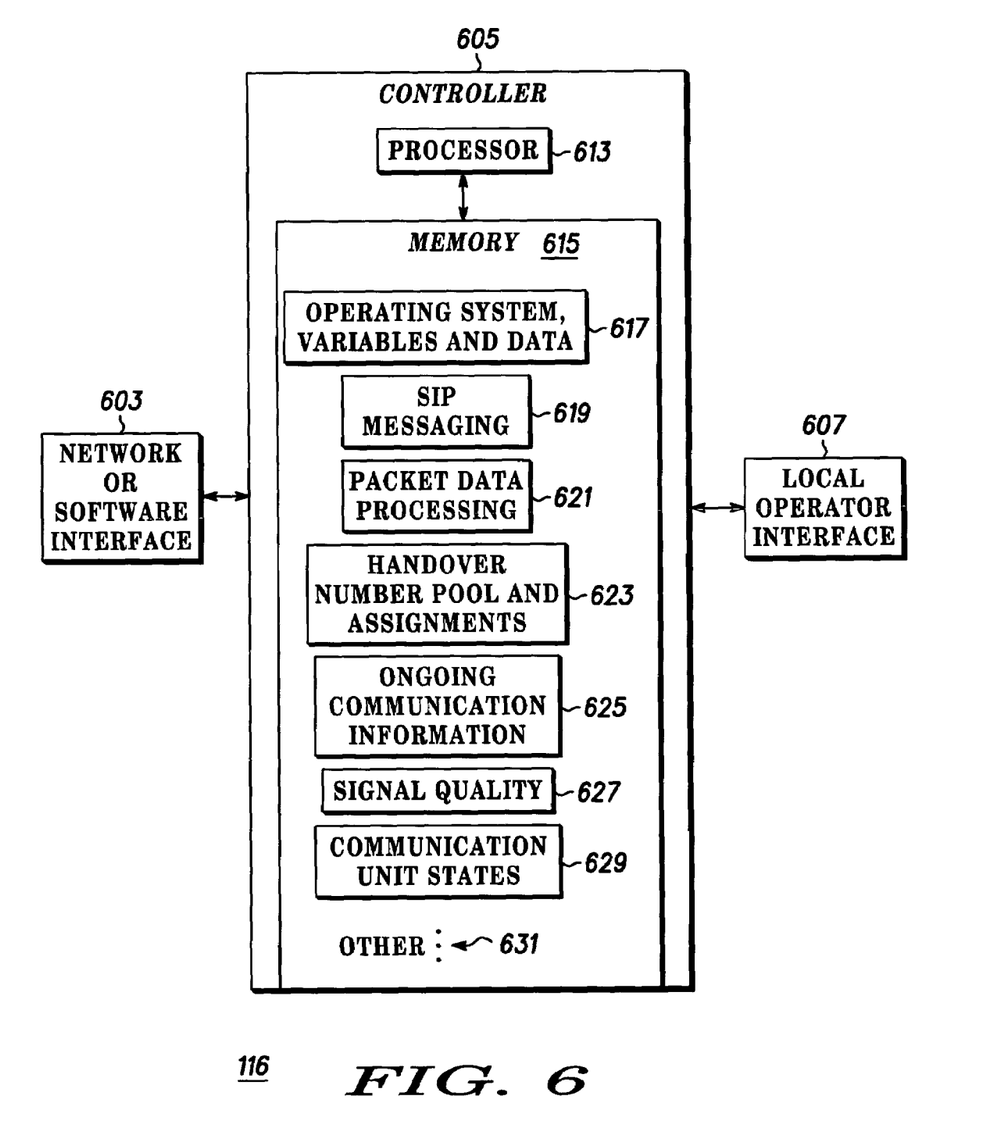
FIG. 6 depicts a simplified block diagram of a mobility manager usable for facilitating a handover of communication from a first to a second communication network.

Referring to FIG. 6, a simplified block diagram of a mobility manager usable for facilitating a handover of communication from a first to a second communication network will be reviewed and discussed. Some of this discussion will be in the nature of a review and summary of portions of the discussions above. The block diagram represents a general purpose computing platform that embodies a stand alone mobility manager, such as mobility manager 116 or the block diagram can be viewed as various of the network entities, such as the proxy server 118 with the portion devoted to the mobility manager functionality emphasized. Generally the mobility manager includes an interface 603, specifically a network interface function, such as a network transceiver or a software interface function if the mobility manager 116 is operating on a platform that also embodies anther network entity. In any event whatever platform is providing the mobility manager 116 will require an interface, such as a transceiver, for interfacing to its respective network, such as the LAN or WLAN 106. This network interface can be an RJ-45 physical connector and support an Ethernet protocol.

The interface 603 is coupled to and controlled by a controller 605 that can be further coupled to a local or remote operator interface, such as a monitor and keyboard or another computing platform all as known. The controller includes a processor 613 that is a general purpose processor that may be redundant for incremental network availability. The processor is coupled to a memory 615 that will be some combination of RAM, ROM, EEPROM, and likely magnetic based memory as would be expected on such platforms. Note a suitable platform, server, or computer is available from various manufacturers, including IBM, Dell, and Hewlett Packard, for example.

The memory includes an operating system, data, and variables 617 that provide the general operating conditions, etc, for the processor as is known. In some embodiments SIP messaging routines 619 are included to facilitate forming and decoding messages according to known SIP protocols. Additionally packet data processing routines 621 are provided for supporting packet data communication within the network according to the conventions used by the network. In those embodiments where needed a pool of handover numbers as well as assignments 623 are provided. Note as discussed above sometimes the mobility manager will assign handover numbers with the assignments varying between one for all handover calls with other identification means, such as caller IDs, Call IDs, and the like being used to distinguish one from another handover, a handover number for each communication unit, or a handover number for each communication that needs to be handed out to another network. The mobility manager will store ongoing communication or call information 625 that is obtained as discussed above for any calls that need to be handed out or transferred to another network. If the mobility manager is responsible for determining when a handover call may be required a signal quality assessment routine 627, operating as noted above will be provided. Furthermore, communication unit states 629 are stored for all communication units that may be involved in a handover call, thus allowing the mobility manager to formulate and respond to SIP messages on behalf of such units. Additionally many other routines 631 that are understood by those of ordinary skill and not further relevant are provided.

In operation the mobility manager 116 or similar network entity with like responsibility and functionality operates to facilitate handover of communication from a first communication network to a second communication network. The mobility manager includes the interface function 603 to interface to the first communication network and the controller 605 that is coupled to and controlling the interface function to obtain call information corresponding to an ongoing communication, stored at 625, between a wireless communication unit and a peer communication unit that uses the first communication network and ascertain a handover number for the wireless communication unit, where the handover number terminates on the mobility manager and is used in facilitating the handover of the ongoing communication to the second communication network.

As noted earlier some embodiments of the mobility manager operate where the first communication network is a wireless local area network or WLAN at least in part and the second communication network is a wireless wide area network or WAN. The controller 605 can obtain the call information from one of the wireless communication unit 102 and a network server, such as the proxy server 118. Various approaches are contemplated for the controller 605 to ascertain the handover number, for example a) obtaining the handover number from the wireless communication unit, b) assigning and providing the handover number to the wireless communication unit from the pool of such numbers 623, or c) obtaining the handover number from another network server, such as the proxy server 118 or network switching function 110. The higher level interface with the first communication network is a Session Initiation Protocol (SIP) interface, an H.323 interface, or similar type of protocol. When a SIP protocol is used and the handover number must be communicated to or from the mobility manager or other network entity, the handover number can be advantageously included in a SIP INVITE message or a response message to the SIP INVITE message, such as SIP OK message.

After the appropriate call information and handover numbers have been communicated or provided, the controller 605 cooperatively with the interface function 603 is operable to or operates to receive a handover call that originates from the wireless communication unit 102 and uses the second communication network, where the handover call is directed to or addressed to the handover number, using the routines 619, 621. This handover call is received from the network switching function 110 for the first communication network and the controller further operates to facilitate connecting the peer communication unit 114 to the handover call and sending a connect indication, such as a SIP OK, for the handover call to the wireless communication unit. Note that the mobility manager in connecting the peer communication unit to the handover call has various alternative choices including a) transferring the ongoing communication of the peer communication unit to the handover call, b) conferencing the ongoing communication of the peer communication unit, the ongoing communication of the wireless communication unit, and the handover call together, or c) rerouting the ongoing communication with the peer communication unit to coincide with the routing of the handover call at the network switching function, where a) and b) have been earlier discussed and c) will be further discussed with reference to FIG. 7-FIG. 10 below.

The controller 605 operates to facilitate the handover call by initiating a message, such as SIP message, that results in routing or re-routing the ongoing communication of the peer communication unit to the handover call. This message in some embodiment can be initiated on behalf of the wireless communication unit. Usually the message is directed to the network switching function 110, since that is a common control point for all relevant calls or call legs. As will be discussed below in systems will multiple network switching functions for the WLAN, this message can be directed to a first network switching function and responsive to this message, a corresponding message is then directed to a second network switching function that is supporting the ongoing communication with the peer communication unit. In any event when a response message initiated by the peer communication unit is received by the controller via the interface function, this response message will trigger sending the connect indication to the wireless communication unit.

Figure 7:
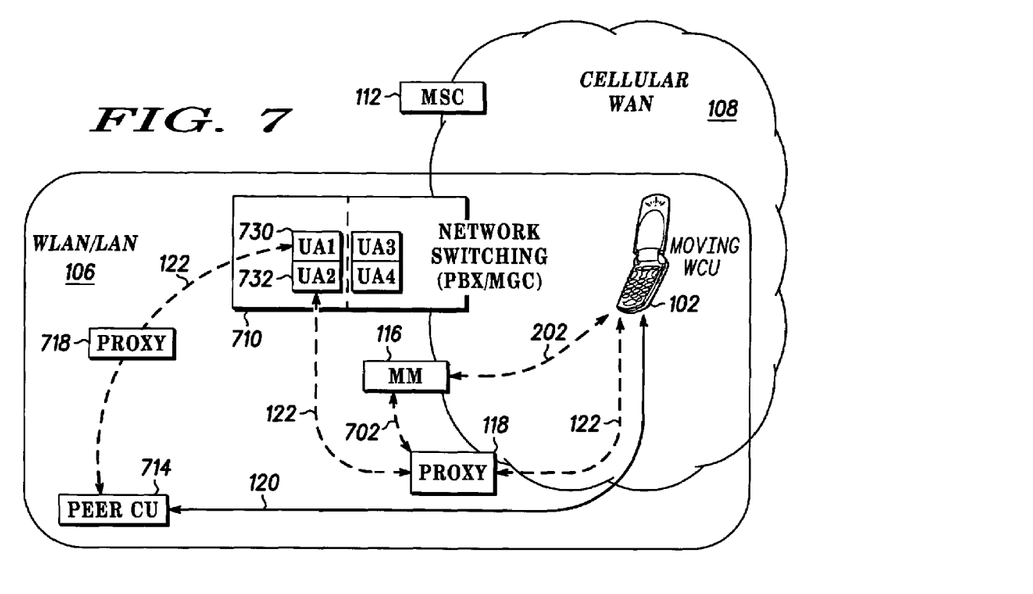
FIG. 7 depicts, in a simplified and representative form, another exemplary system diagram where the handover method and apparatus can be implemented.

Referring to FIG. 7, another simplified and representative exemplary system diagram where the handover method and apparatus can be implemented will be discussed and described. Note that FIG. 7 deals with the same handover problems that were discussed above with reference to FIG. 1-FIG. 4, however the processes discussed with reference to FIG. 7-FIG. 10 are more generalized can be suitable for operation in more generalized system environments. In FIG.

7 like reference numerals refer to like or similar elements to those discussed with reference to FIG. 1-FIG. 4 and the various alternative embodiments and processes, such as where handover numbers are obtained and how exchanged and how call information is exchanged, also apply to this system embodiment.

FIG. 7 does show a peer communication unit 714 that is a packet data unit that operates, through a proxy 718 if available, at least within the LAN or WLAN 106. The network switching function 710 for the WLAN 106 uses a SIP construct, specifically back to back user agents (BTBUA), where each user agent (UA) handles or supports communication with one entity, such as UA1 730 for the peer unit 714 or UA2 732 for the wireless communication unit 102. As is known in SIP systems the BTBUAs involved in the same call or communication share certain call information for that communication only among themselves. The network switching function 710 thus performs the same or similar functions as the switching function 110 discussed above. The ongoing communication between the wireless communication unit 102 and the peer communication unit 714, before the handover occurs, is represented as depicted by the solid line 120 for the bearer path or RTP portion and the dashed lines 122 for the signaling and control portion of the call or communication. Note that the bearer portion 120 is shown going directly from the peer unit 714 to the wireless unit 102, which results since the peer unit 714 is within the LAN or WLAN 106. The mobility manager knows the relevant call information via 702, 202 and along with the wireless communication unit 102 the handover number via 202 as above discussed and utilized.

Figure 8:
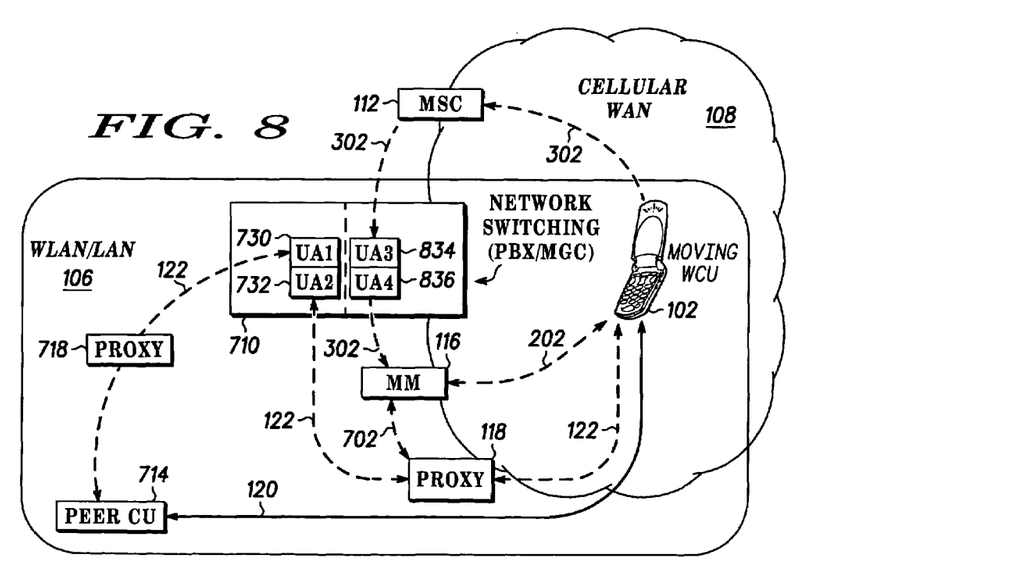
FIG. 8 and FIG. 9 depict various exemplary states in the handover of the ongoing communication for the FIG. 7 system.

Referring to FIG. 8, the next procedure, namely placing a handover call via the WAN is depicted and will be discussed and described. When a handover situation becomes imminent as determined and described above, the wireless communication unit 102 initiates a handover call, depicted by dashed lines 302 through the second communication network 108 or WAN where the call is directed or addressed to the handover number. This handover number terminates on the mobility manager 116 and thus the handover call is routed via the network switching function 112 to the network switching function 110, specifically UA3 834 to UA4 836 (another BTBUA pair), and then to the mobility manager 116. Note that the ongoing communication continues via 120, 122.

Figure 9:
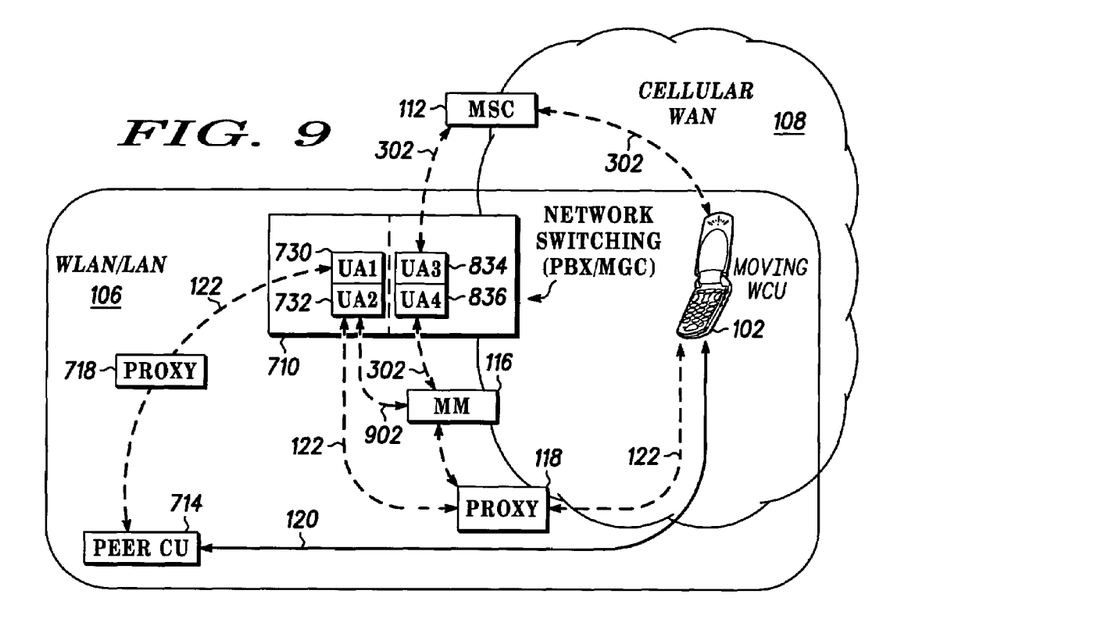

Referring to FIG. 9, the processes preparatory to re-routing the ongoing communication to the second network 108 are shown and will be described and discussed. After receiving the handover call 302 the mobility manager 116 sends or directs a message 902, in one embodiment a SIP (re-) INVITE message either from the wireless communication unit 102 if the mobility manager 116 has provided sufficient information regarding the handover call to the unit 102 or on behalf of the unit 102 to the peer communication unit 714 of the wireless communication unit 102 via UA2 732. Sending the message on behalf of the unit 102 adds some robustness in the event that the unit 102 has moved out of WLAN service or otherwise lost the signal from the WLAN. Note in a SIP based system sending a re INVITE or mid session INVITE message is a good way to change the IP address and port to those that are to be used by the peer communication unit 714 for the RTP bearer for the session. This message requests that the peer unit 714 route it's voice bearer RTP to the RTP port associated with the handover call, e.g. WAN leg or UA4 836, rather than the wireless communication unit 102. Note that the peer or actual peer of the wireless communication unit 102 is UA2 732 in the SIP sense, rather than the peer communication unit 714, however the RTP that will be re routed as a result of the message being forwarded to UA1 730 and then to the peer unit 714 is the RTP from or for the peer unit 714.

Furthermore the mobility manager 116 responds to the handover call by sending a SIP OK message 302 to UA4 836 that is responsive to the SIP INVITE representing the handover call via the second network. With the SIP OK response the mobility manager requests the switching function 710 to route the RTP for the handover call from the WAN to the RTP port of the peer communication unit 714. This is a good way in a SIP controlled call to tell the switching function 710 where to send the bearer. The mobility manager 116 knows the peer unit 714 RTP address and port from the call information that was obtained from the wireless unit 102 or proxy server 118 at for example call setup. As a result of the SIP OK via UA3 834, the wireless communication unit 102 will get a WAN connect signal. The wireless communication unit 102 can then switch its uplink and downlink voice or RTP to the WAN path or the handover call. Given the earlier re INVITE and the SIP OK the voice will be routed as an RTP stream to the peer communication unit 714.

Note that when the mobility manager 116 sends the re INVITE message it first waits for a SIP OK message from the peer communication unit 714. The mobility manager then sends the SIP OK response to the handover call via UA4 836. Ideally this SIP OK response would be sent concurrently with a SIP ACK that is responsive to the SIP OK from the peer communication unit 714 as these messages cause the audio to be re routed. However, real world lag times or delays indicate a 50 millisecond delay after sending the SIP OK response before sending the SIP ACK will more closely align the transfer of audio or RTP routing. Experimentation on actual systems may determine an appropriate delay that is more or less than the cited 50 milliseconds. After the wireless communication unit 102 switches the uplink and downlink routing, it can tear down the WLAN path represented by lines 120 and 122 (except line 122 from the peer unit 714 to UA1 730. This should not be done using a SIP BYE message as the session at the peer unit 714 still exists (see dashed line 122 at peer unit 714) and only the routing has been modified. The wireless unit 102 can terminate this call by releasing the WLAN resources devoted to the ongoing communication 120, 122. Note that if the mobility manager is co-located with the SIP proxy 118 it could intercept any such SIP BYE messages from the wireless communication unit 102.

Figure 10:
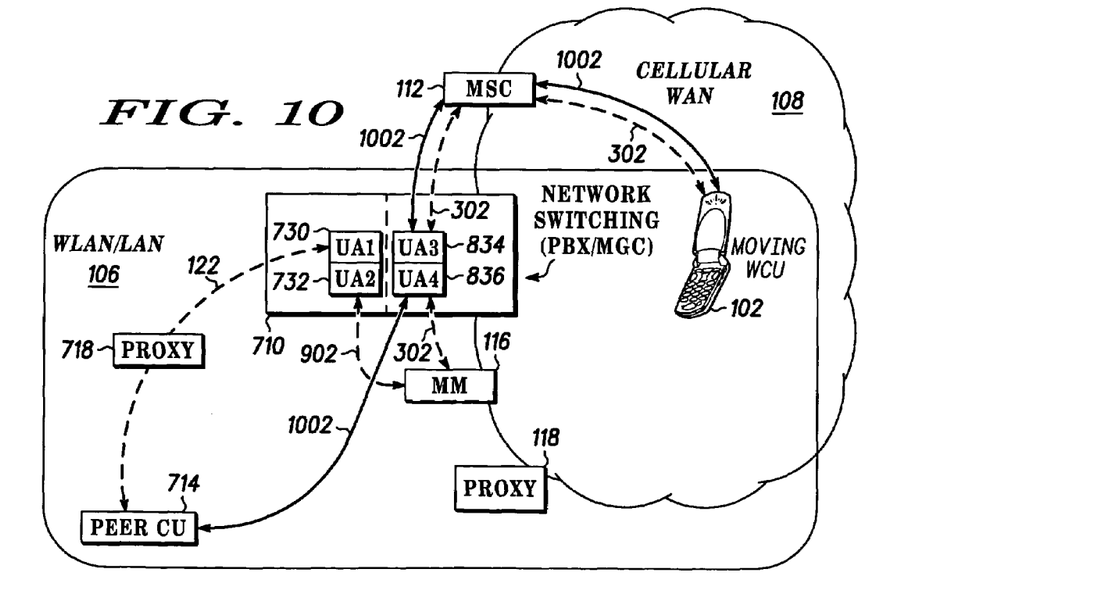
FIG. 10 shows the system diagram of FIG. 7 after the handover of the ongoing communication has been accomplished.

Referring to FIG. 10, the system diagram of FIG. 7 after the handover of the ongoing communication has been accomplished will be discussed and described. Note that the bearer portion of the WLAN ongoing communication, depicted in earlier figures as solid line 120 is no longer present. Note that the dashed lines 302, 902 and 122 depict the signaling and control portion of the communication between the wireless communication unit 102 and the peer communication unit 714 after the handover. From the wireless communication unit 102 dashed line 302 is routed through the WAN 108 and network switching function 112 to the network switching function 110 for the LAN or WLAN 106, specifically UA3 834 and UA4 836, and then to the mobility manager 116. This signaling and control within the LAN in one embodiment uses SIP processes, while ISUP or SS7 messaging or the like may be used within the WAN or outside the LAN. From the mobility manager 116 as shown by 902 the signaling and control portion is routed via UA2 732 and UA1 730 to the proxy server 718 and then to the peer communication unit 714 via line 122. The bearer portion or payload portion of the communication is routed from the wireless communication unit 102 as depicted by solid line 1002 through the WAN 108 and switching function 112 to the network switching function 110, specifically UA3 834 and UA4 836 to the peer communication unit 714. Note that the bearer 1002 within the LAN 106 is an RTP stream while the bearer outside the LAN can be a voice bearer or the like. The bearer within the WAN can also be a packet data bearer, such as an RTP stream or whatever is appropriate given the specifics of the WAN 108.

Note that after the handover or transfer of the ongoing communication to the second network 108 there are in effect three pairs of BTBUAs involved. The first pair UA1 730 and UA2 731 essentially support or service the original WLAN based call with the peer communication unit 714. The second pair UA3 834 and UA4 836 support or service the ongoing communication between the mobility manager and the wireless communication unit 102 via the WAN 108. The third pair is within the mobility manager 116. This approach works in a LAN supported by a single switching function or PBX or MGC and advantageously does not need to do any call transfer or conferencing (e.g. no SIP REFER messages). Furthermore in a multi-site enterprise, for example multiple buildings in diverse cities or locations with multiple network switching functions (one for each site for example), different communication with the wireless communication unit 102 may be handled by different network switching functions. The above described procedures also operate in such situations, since no direct communication is needed between pairs of user agents. The user agent pairs can be in different network switching functions, provided that all ongoing communication or calls with the wireless communication unit 102 are known by a single mobility manager 116. For example if there is a second ongoing communication with the wireless communication unit 102 the user agent pairs associated with the second ongoing communication can be in different network switching functions.

Figure 11:
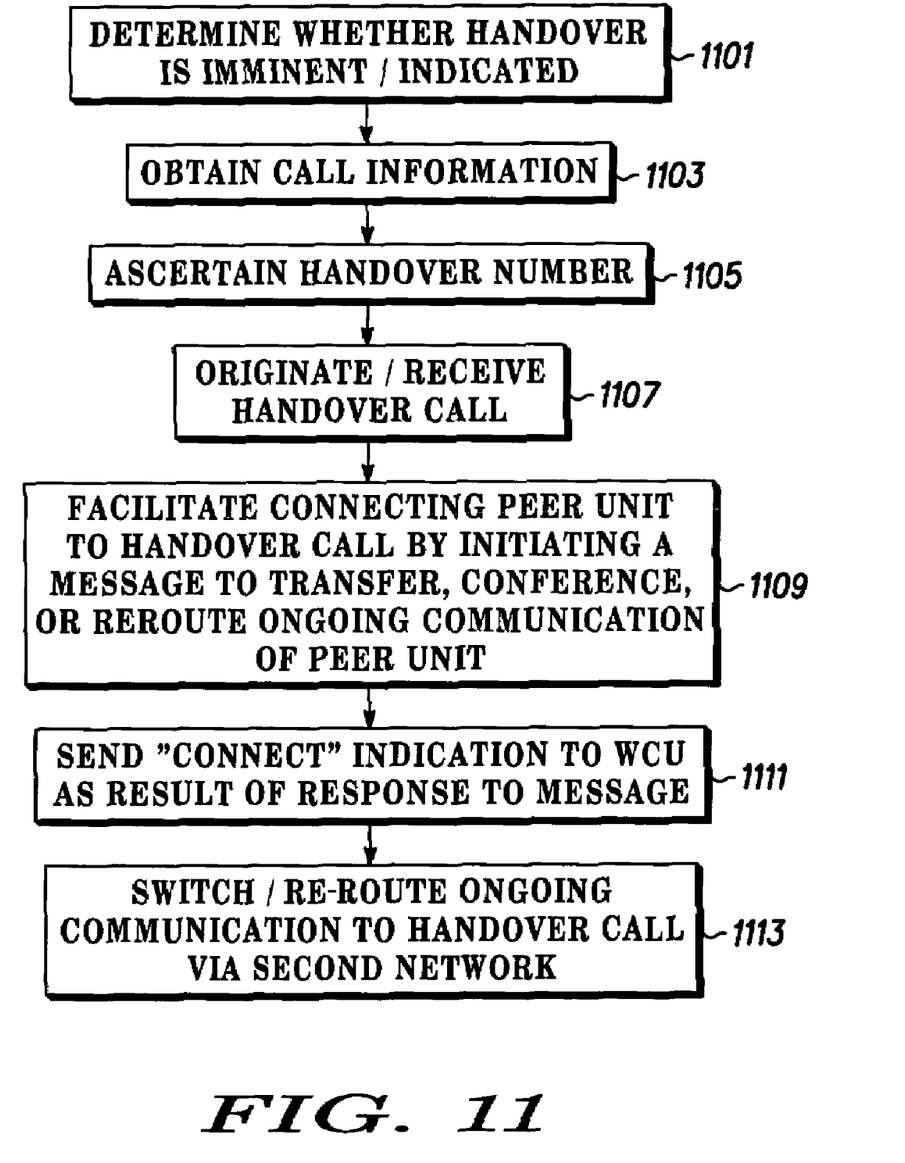
FIG. 11 illustrates a diagram of a preferred method embodiment of providing a handover of an ongoing communication from a first to a second wireless communication network.

Referring to FIG. 11, a diagram of a preferred method embodiment of providing a handover of an ongoing communication from a first to a second wireless communication network will be discussed and described. Much of this discussion will as required reference the above figures and will be provided in an overview form in order to avoid undue duplication of some of the above disclosure. As will be appreciated, this method can be practiced by the structures and apparatus described above or by alternative arrangements. For example, much of the method can be advantageously implemented in the mobility manager or similar functionality implemented as a part of the switching function or proxy server. The method depicted in FIG. 11 is an approach for facilitating handover of communication between two communication units from a first communication network to a second communication network. The method begins at 1101 with determining that a handover condition is indicated or imminent where a wireless communication unit 102 that is moving or another network entity, such as the mobility manager 116, within the first communication network 106, can perform this determination. At 1103 obtaining call information is performed where the call information corresponds to an ongoing communication between the wireless communication unit and a peer communication unit 714, the ongoing communication using the first communication network. The call information can be obtained from or by the wireless communication or a network entity, such as the mobility manager 116 within the first communication network.

Then 1105 shows ascertaining a handover number for use by the wireless communication unit where the handover number terminates within the first communication network, for example at or on the mobility manager 1116. The handover number is used in facilitating the handover of the ongoing communication to the second communication network 108.

As noted above various alternatives exist for ascertaining the handover number. For example, the handover number can be obtained from the wireless communication unit, the handover number can be assigned and provided to the wireless communication unit by a network server or the mobility manager 116, or it can be obtained from a network server.

In some embodiments the first communication network is a wireless local area network and the second communication network is a wireless wide area network. Furthermore, for example, the first communication network can use a Session Initiation Protocol interface, an H.323 interface, or the like for signaling and control of communication. In certain embodiments ascertaining the handover number and obtaining the call information is advantageously done during the setup of the ongoing communication with the implicit assumption that a handover may be required at some point during the communication. Thus it will be appreciated that the processes at 1103 and 1105 can occur prior to those of 1101.

Next receiving a handover call originating from the wireless communication unit using the second communication network that is directed to the handover number is shown at 1107. Receiving or specifically originating the handover call results from determining that the handover condition is indicated. The handover call is received at a network switching function 110 for the first communication network 106 and routed to a network entity such as the mobility manager 116. The network entity operates to facilitate connecting 1109 the peer communication unit to the handover call by, for example, initiating a message that results in routing the ongoing communication of the peer communication unit to the handover call. The message can be initiated on behalf of, e.g. as though coming from, the wireless communication unit.

The message is further directed to the network switching function 110, e.g. routed through the network switching function, to the peer communication unit 714. The message can alternatively be directed to or routed through a first network switching function and then to or through a second network switching function and then to the peer communication unit. Connecting the peer communication unit to the handover call can alternatively comprise, given appropriate SIP messages noted above, a) transferring the ongoing communication of the peer communication unit to the handover call, b) conferencing the ongoing communication of the peer communication unit, the ongoing communication of the wireless communication unit, and the handover call together, or c) rerouting the ongoing communication with the peer communication unit to coincide with the routing of the handover call at the network switching function 110.

In any event a connect indication 1111 for the handover call is sent to the wireless communication unit 102 by the network entity or mobility manager 116 and this is triggered by a response message (responsive to the message) initiated by the peer communication unit that is received by the network entity. Then 1113 shows switching or rerouting the ongoing communication to the handover call via the second network. The rerouting is accomplished by the connect indication and an acknowledgment of the response message.

In this manner, initiating a handover call with a second network concurrently with or just after a handover condition is indicated provides for increased customer satisfaction since the likelihood of dropping an ongoing call or communication or experiencing poor network service is reduced. It should be noted that the methods and apparatus described above for handling handover from one to another communication network of ongoing communication between communication units may be implemented in reverse or with different communication networks than those utilized in the examples above. For example, the first wireless communication network may be the cellular WAN and the second network may be the WLAN.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A mobility manager for facilitating handover of ongoing communication of a first call between a wireless communication unit and a peer communication unit from a first communication network to a second communication network, the mobility manager comprising:
    a interface function to interface to the first communication network; and
    a controller coupled to and controlling the interface function to:
    obtain call information corresponding to the ongoing communication of the first call;
    ascertain a handover number for the wireless communication unit, the handover number terminating on the mobility manager associating with the first communication network, for use in facilitating the handover of the ongoing communication by initiating a handover call made by the wireless communication unit on the second communication network to the handover number while the first call is ongoing;
    receive the handover call from a network switching function for the first communication network, and
    facilitate connecting the peer communication unit to the handover call and sending a connect indication for the handover call to the wireless communication unit, and
    wherein the connecting the peer communication unit to the handover call further comprises one of a) transferring the ongoing communication of the peer communication unit to the handover call, b) conferencing the ongoing communication of the peer communication unit, the ongoing communication of the wireless communication unit, and the handover call together, and c) rerouting the ongoing communication with the peer communication unit to coincide with the routing of the handover call at the network switching function.

2. The mobility manager of claim 1 wherein the controller further obtains the call information from at least one of the wireless communication unit and a network server.

3. The mobility manager of claim 1 wherein the first communication network is at least one of an IEEE 802.11 Wireless Local Area Network and Bluetooth and the second communication network is a wireless wide area network.

4. The mobility manager of claim 1 wherein the controller operates to facilitate the handover call by initiating a message that results in routing the ongoing communication of the peer communication unit to the handover call.

5. The mobility manager of claim 4 wherein the message is further initiated on behalf of the wireless communication unit.

6. The mobility manager of claim 4 wherein the message is further directed to the network switching function.

7. The mobility manager of claim 4 wherein the message is directed to a first network switching function and responsive to the message, a corresponding message is directed to a second network switching function that is supporting the ongoing communication with the peer communication unit.

8. The mobility manager of claim 7 wherein a response message initiated by the peer communication unit is received by the controller via the interface function and this response message triggers sending the connect indication to the wireless communication unit.

9. The mobility manager of claim 1 wherein the ascertaining the handover number further comprises at least one of obtaining the handover number from the wireless communication unit, assigning and providing the handover number to the wireless communication unit, and obtaining the handover number from another network server.

10. The mobility manager of claim 9 wherein the handover number is included in at least one of a SIP INVITE message and a response message to the SIP INVITE message.

11. The mobility manager of claim 1 wherein the interface with the first communication network is at least one of a Session Initiation Protocol (SIP) interface and an H.323 interface.

12. A method for facilitating handover of ongoing communication of a first call between a wireless communication unit and a peer communication unit wherein the handover being from a first communication network to a second communication network, the method comprising:
    obtaining call information corresponding to the first call using the first communication network;
    ascertaining a handover number for the wireless communication unit, the handover number terminating within the first communication network for use in facilitating the handover of the ongoing communication by initiating a handover call made by the wireless communication unit on the second communication network to the handover number while the first call is ongoing;
    receiving, at a network switching function for the first communication network, a handover call originating from the wireless communication unit using the second communication network that is directed to the handover number;
    facilitating, at a network entity, connecting the peer communication unit to the handover call and sending a connect indication for the handover call to the wireless communication unit, and
    wherein the connecting the peer communication unit to the handover call further comprises at least one of a) transferring the ongoing communication of the peer communication unit to the handover call, b) conferencing the ongoing communication of the peer communication unit, the ongoing communication of the wireless unit, and the handover call together, and c) rerouting the ongoing communication with the peer communication unit to coincide with the routing of the handover call at the network switching function.

13. The method of claim 12 wherein the obtaining the call information further comprises obtaining the call information from at least one of the wireless communication unit and a network entity within the first communication network.

14. The method of claim 12 wherein the first communication network is at least one of an IEEE 802.11 Wireless Local Area Network and Bluetooth and the second communication network is a wireless wide area network.

15. The method of claim 12 wherein the receiving the handover call results from determining that a handover condition is indicated.

16. The method of claim 15 wherein the determining the handover condition is performed by at least one of the wireless communication unit and another network entity within the first communication network.

17. The method of claim 12 wherein the network entity operates to facilitate the handover call by initiating a message that results in routing the ongoing communication of the peer communication unit to the handover call.

18. The method of claim 17 wherein the message is further initiated on behalf of the wireless communication unit.

19. The method of claim 17 wherein the message is further directed to the network switching function.

20. The method of claim 17 wherein the message is directed to a first network switching function and then to a second network switching function and then to the peer communication unit.

21. The method of claim 20 wherein a response message initiated by the peer communication unit is received by the network entity and this response message triggers sending the connect indication to the wireless communication unit.

22. The method of claim 12 wherein the ascertaining the handover number further comprises at least one of obtaining the handover number from the wireless communication unit, assigning and providing the handover number to the wireless communication unit, and obtaining the handover number from another network server.

23. The method of claim 22 wherein the handover number is included in at least one of a SIP INVITE message and a response message to the SIP INVITE message.number from a network entity within the first communication network.

24. The method of claim 12 wherein the first communication network uses at least one of a Session Initiation Protocol (SIP) interface and an H.323 interface.

25. The method of claim 24 wherein the ascertaining the handover number is done during the setup of the first call.

* * * * *